US012623679B2

(12) United States Patent
Nguyen et al.

(10) Patent No.: US 12,623,679 B2
(45) Date of Patent: May 12, 2026

(54) MOVING VEHICLE DIAGNOSTIC SYSTEM WITH CONSOLE DISPLAY INTEGRATION AND CONTEXTUAL WARNING MANAGEMENT

(71) Applicant: Innova Electronics Corporation, Irvine, CA (US)

(72) Inventors: Tai Nguyen, Ho Chi Minh City (VN); Quan Nguyen, Ho Chi Minh City (VN); Thuan Huynh, Ho Chi Minh City (VN)

(73) Assignee: Innova Electronics Corporation, Irvine, CA (US)

( * ) Notice: Subject to any disclaimer, the term of this patent is extended or adjusted under 35 U.S.C. 154(b) by 97 days.

(21) Appl. No.: 18/817,843

(22) Filed: Aug. 28, 2024

(65) Prior Publication Data

US 2026/0062021 A1     Mar. 5, 2026

(51) Int. Cl.
  B60W 50/14   (2020.01)
  B60K 35/29   (2024.01)
  B60W 50/02   (2012.01)

(52) U.S. Cl.
  CPC ............. B60W 50/14 (2013.01); B60K 35/29 (2024.01); B60W 50/0205 (2013.01); B60W 2050/021 (2013.01); B60W 2050/146

(2013.01); B60W 2555/20 (2020.02); B60W 2556/10 (2020.02); B60W 2556/50 (2020.02)

(58) Field of Classification Search
  None
  See application file for complete search history.

(56) References Cited

U.S. PATENT DOCUMENTS 9,244,650 B2 * 1/2016 Platz .................. G08G 1/09626
9,811,086 B1 * 11/2017 Poeppel .............. G07C 5/0808

* cited by examiner

*Primary Examiner* — Peter D Nolan
*Assistant Examiner* — Michael F Whalen
(74) *Attorney, Agent, or Firm* — Stetina Garred Brucker & Newboles

(57)     ABSTRACT

A moving vehicle diagnostic system with console display integration includes a mobile device and an onboard diagnostic interface that receives vehicle status data via a vehicle data link connector. The system determines one or more vehicle conditions from received vehicle status data and then determines a severity of each determined vehicle condition. The system communicates structured vehicle status information, warnings or instructions to show on the integrated vehicle console display. Display information is provided to from the mobile device to the vehicle console display a wireless data connection such as Bluetooth, Bluetooth Low Energy (BLE), WiFi or WiFi direct or via a wired data connection, such a USB cable.

20 Claims, 9 Drawing Sheets

MOVING VEHICLE DIAGNOSTIC SYSTEM WITH CONSOLE DISPLAY INTEGRATION AND CONTEXTUAL WARNING MANAGEMENT

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present disclosure relates generally to vehicle diagnostic testing and repair. The disclosure relates more particularly to systems for providing drivers with minimally disruptive, structured real-time vehicle driver warnings, alerts and diagnostic information derived from a vehicle onboard diagnostic port using a vehicle's built in console display.

2. Description of the Related Art

A concept of vehicle onboard diagnostic systems began in the 1960s and 1970s, driven primarily by a need to monitor and control vehicle emissions. Early electronic fuel injection systems required basic diagnostics to ensure proper functioning. In 1970, the U.S. Environmental Protection Agency (EPA) established the Clean Air Act, leading to the development of emission control technologies.

In the 1980s, the first generation of onboard diagnostic (OBD) systems, known as OBD1, was introduced. These systems were manufacturer-specific and primarily focused on emissions monitoring. In 1988, the California Air Resources Board (CARB) mandated OBD systems for all vehicles sold in California.

The introduction of OBD2 systems in 1994 marked a significant advancement. These systems provided a standardized set of diagnostic trouble codes (DTCs) and a universal Data Link Connector (DLC), allowing real-time monitoring of various engine and vehicle parameters while driving. By 1996, OBD2 became mandatory for all cars and light trucks sold in the U.S., enabling more comprehensive real-time diagnostics.

In the late 1990s and early 2000s, real-time data from OBD2 could be accessed via scan tools connected to the DLC, allowing drivers and technicians to monitor engine RPM, vehicle speed, and other sensor outputs in real-time. The 2000s saw the integration of more advanced sensors and vehicle Electronic Control Units (ECUs), providing comprehensive real-time monitoring of data such as oxygen sensor readings, fuel trim levels, and misfire counts. The emergence of early telematics systems provided the capability to transmit real-time OBD data to external devices and cloud platforms.

The 2010s witnessed the rise of wireless communication technologies, enabling real-time transmission of OBD data to remote servers and smartphones. This allowed for real-time vehicle health monitoring and diagnostics while driving. Consumer applications that could plug into the DLC and communicate with smartphones became popular, allowing drivers to receive real-time alerts and performance data.

Modern OBD systems offer comprehensive monitoring of a wide range of parameters in real-time, such as fuel efficiency, emissions, engine load, and coolant temperature, providing immediate feedback to drivers and technicians.

In a conventional smartphone DTC analysis, a Bluetooth or Wi-Fi-enabled OBD2 adapter is plugged into the vehicle's OBD2 port, reading data from the vehicle's OBD system and transmitting the data wirelessly to the smartphone. The driver may install an OBD2 app on their smartphone, which is designed to receive data from the OBD2 adapter, possibly interpret the data, possibly communicate with a remote resource for data analysis, and display the data and/or diagnostic results derived from the data in real-time.

The app may provide a dashboard with various digital gauges, graphs, and meters. The interface displays real-time data such as engine RPM, vehicle speed, fuel consumption, coolant temperature, and more. As the vehicle is driven, the OBD2 adapter may continuously transmits data to the smartphone. The app processes this data and updates the smartphone display in real-time, showing metrics like engine RPM on a tachometer gauge or current speed on a speedometer gauge on the smartphone display. Smartphones are frequently mounted on a dashboard or windshield mount within the driver's line of sight. The smartphone display typically works concurrently with a vehicle's built-in display.

In the United States, the National Highway Traffic Safety Administration (NHTSA) sets standards and guidelines for automobile displays through the Federal Motor Vehicle Safety Standards (FMVSS). These regulations cover various aspects of vehicle safety, including display systems. One of the critical considerations is minimizing driver distraction. NHTSA's guidelines suggest that in-vehicle displays should not require drivers to take their eyes off the road for more than a few seconds. Additionally, SAE International's recommended practices, such as SAE J2364, offer further guidance on the design of these displays to ensure they do not overly distract drivers. Infotainment displays, heads-up displays (HUDs), and rearview camera displays all fall under these regulations, with specific requirements to enhance safety and usability.

In Europe, the European Union follows UNECE regulations, with UNECE Regulation No. 125 specifying field of vision requirements for displays. The General Safety Regulation (GSR) mandates the inclusion of advanced driver assistance systems (ADAS), which often utilize displays for visual alerts and information. The European Committee for Standardization (CEN) provides additional standards focusing on the design and ergonomic aspects of in-vehicle displays to ensure they meet safety and usability criteria.

In Asia, countries like Japan and China have their own regulatory frameworks. In Japan, the Japanese Automobile Standards Internationalization Center (JASIC) has adopted regulations similar to those of the UNECE, emphasizing the reduction of driver distraction and ensuring display visibility. China's GB Standards set national requirements for vehicle safety, including in-vehicle displays, with a strong focus on minimizing driver distraction and ensuring that displays do not interfere with safe vehicle operation.

Common restrictions and guidelines across various regions emphasize the importance of minimizing driver distraction and controlling brightness and glare. These measures aim to ensure that in-vehicle displays contribute positively to the driving experience without compromising safety.

It is thus to be appreciated that much consideration goes into the design and placement of onboard vehicle displays. Conversely, a user's vehicle smartphone setup has no corresponding considerations. Some jurisdictions have regulations that limit the use of a smartphone display concurrently with a car display while driving to reduce driver distraction and enhance road safety. These regulations vary by country and region, and they typically focus on restricting the use of handheld devices while driving.

In the United States, laws regarding the use of handheld devices while driving are determined by individual states. Many states have implemented laws that ban or limit the use of handheld smartphones while driving. For instance, states like California, New York, and Illinois prohibit the use of handheld devices while driving, requiring drivers to use hands-free options. While these laws focus primarily on handheld use, they implicitly limit the use of smartphone displays.

In Europe, various countries have strict laws regarding the use of smartphones while driving. In the United Kingdom, it is illegal to hold a phone or satellite navigation system (sat nav) while driving or riding a motorcycle. Drivers must use hands-free access, such as Bluetooth, voice command, or dashboard mounts, to avoid penalties. Germany prohibits drivers from using handheld electronic devices while the vehicle is in motion. This includes smartphones, which must be used in a hands-free mode if needed for navigation or other functions. In France, the use of handheld devices is banned while driving, and this extends to the use of smartphones as secondary displays alongside the car's built-in display.

Australia has stringent regulations on the use of mobile phones while driving, with laws varying by state and territory. Generally, it is illegal to use a handheld phone while driving, and this includes using the phone as a display device. Drivers can use their phones hands-free, provided the phone is secured in a commercially designed holder fixed to the vehicle.

In Canada, the use of handheld devices while driving is prohibited in all provinces and territories. This includes the use of smartphones as secondary displays. Drivers are encouraged to use hands-free systems, which can include integration with the car's built-in display through systems like Android Auto™ or Apple CarPlay®.

By way of particular example, one of the primary reasons applications such as Android Auto™ force applications like Google Maps™ and other navigation functions to be shown on the automobile console rather than the phone screen is to comply with safety regulations.

The evolution of vehicle onboard diagnostic systems has significantly enhanced the ability to monitor and manage vehicle performance, starting from basic emission controls in the 1960s to the advanced, real-time data systems of today. As these technologies have progressed, so too have the regulations and standards aimed at ensuring that in-vehicle displays and associated mobile devices are designed with safety in mind. While onboard integrated infotainment displays are optimized for minimizing driver distraction, the added use of smartphones and other handheld devices presents unique challenges.

BRIEF SUMMARY

In an example embodiment, a moving vehicle diagnostic system with console display integration includes a mobile device, such as a smartphone or tablet. The mobile device includes a processor and associated memory, and an onboard diagnostic (OBD) interface that receives vehicle status data via an associated vehicle data link connector (DLC). The system establishes a data link to an associated vehicle infotainment system console display and determines one or more vehicle conditions from received vehicle status data. The system then determines a severity of each determined vehicle condition and communicates a warning to show on the console display for each vehicle condition determined to have a severity that requires immediate remedial action. A remedial action is generated for one or more determined vehicle conditions. When the vehicle is stopped, an expanded explanation for one or more determined vehicle conditions is generated, in accordance with received vehicle status data is shown on the console display when the vehicle is stopped.

In a further example embodiment, the system determines if a malfunction indicator lamp (MIL) signal is present in the received vehicle status data. A cause of the MIL is determined and a concise explanation of the MIL is generated and shown on the vehicle console display.

In a further example embodiment, display information is provided to the vehicle console display a wireless data connection such as Bluetooth, Bluetooth Low Energy (BLE), WiFi or WiFi direct.

In a further example embodiment, display information is provided to the vehicle console display via a wired data connection, such a USB cable.

BRIEF DESCRIPTION OF THE DRAWINGS

These and other features and advantages of the various embodiments disclosed herein will be better understood with respect to the following description and drawings, in which.

DETAILED DESCRIPTION

Figure 1:
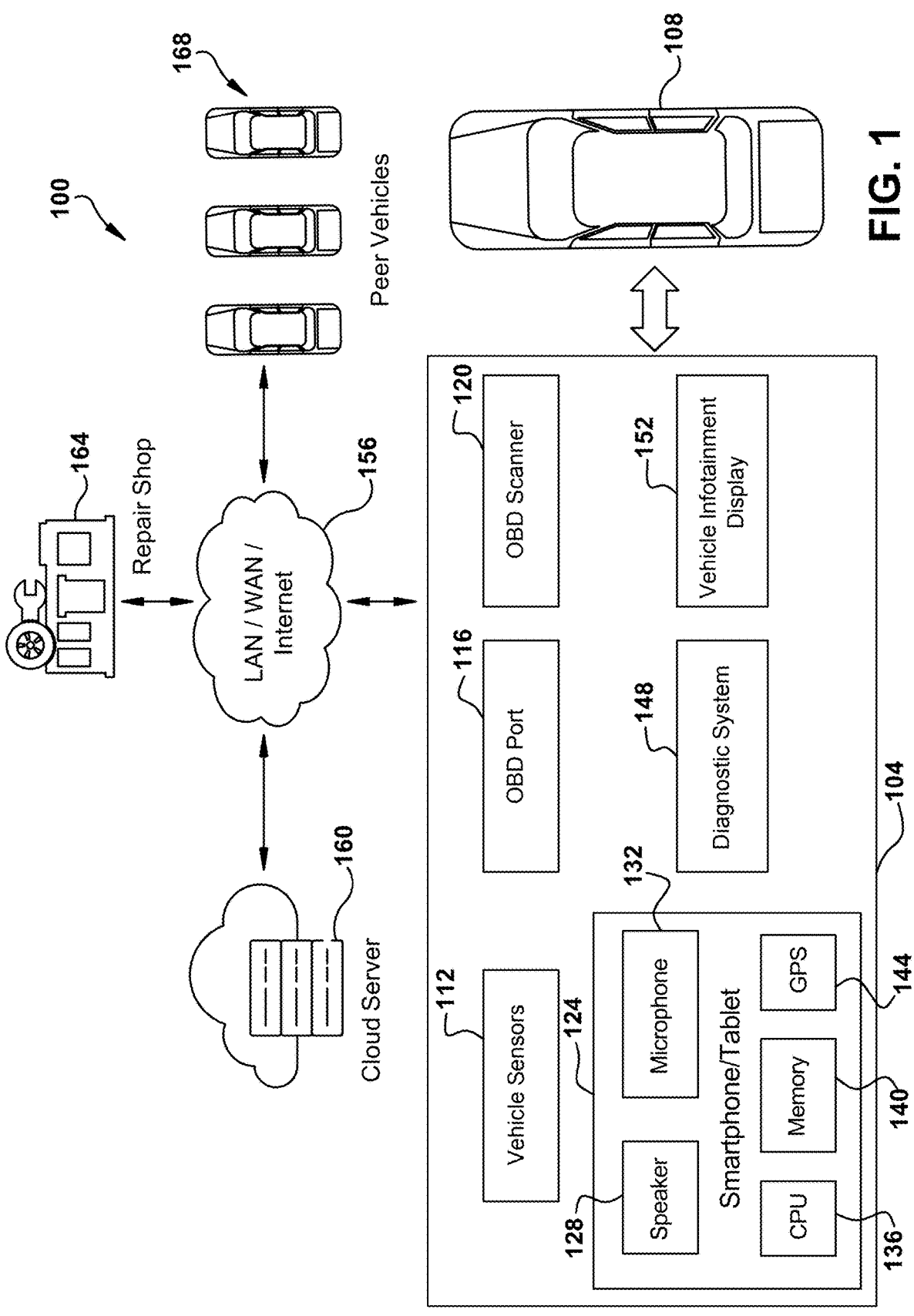
FIG. 1 illustrates an example embodiment of an operational environment for a moving vehicle diagnostics system with console display integration and contextual warning management.

The detailed description set forth below in connection with the appended drawings is intended as a description of certain embodiments of a vehicle diagnostic system and related method, and is not intended to represent the only forms that may be developed or utilized. The description sets forth the various structure and/or functions in connection with the illustrated embodiments, but it is to be understood, however, that the same or equivalent structure and/or functions may be accomplished by different embodiments that are also intended to be encompassed within the scope of the present disclosure. It is further understood that the use of relational terms such as first and second, and the like are used solely to distinguish one entity from another without necessarily requiring or implying any actual such relationship or order between such entities.

The particulars shown herein are by way of example only for purposes of illustrative discussion, and are not presented in the cause of providing what is believed to be most useful and readily understood description of the principles and conceptual aspects of the various embodiments of the present disclosure. In this regard, no attempt is made to show any more detail than is necessary for a fundamental understanding of the different features of the various embodiments, the description taken with the drawings making apparent to those skilled in the art how these may be implemented in practice.

Distracted driving due to cell phones, secondary screens, and information overload is a serious issue in the United States, leading to numerous negative outcomes. The use of cell phones while driving is one of the most prevalent forms of distracted driving. Viewing or using apps diverts a driver's attention away from the road, increasing the likelihood of accidents. In 2019, distracted driving claimed 3,142 lives, many of which involved the use of cell phones. The constant need to check notifications or messages forces drivers to take their eyes off the road, hands off the wheel, and minds off driving.

Secondary screens, such as those used in smartphone-based OBD systems, can also be highly distracting. When drivers need to glance at these screens for vehicle data or navigation, it splits their focus and increases cognitive load. Excessive detail and redundant information on these screens can be overwhelming, causing drivers to spend more time looking at them instead of paying attention to driving. Information overload from these systems, which provide too much or redundant data already available from dedicated dashboard gauges, further exacerbates the problem by cluttering the driver's visual field and making it difficult to discern what is immediately relevant. This distraction can lead to severe consequences, including accidents and fatalities.

Injuries resulting from distracted driving due to cell phones, secondary screens, and information overload range from minor to severe. Thousands of people are injured every year because drivers divert their attention to these devices.

These injuries not only cause physical pain but also bring significant medical expenses and long-term rehabilitation needs.

The economic impact of distracted driving is substantial. The costs associated with accidents caused by cell phone use, secondary screens, and information overload include medical expenses, property damage, lost productivity, and legal fees. Insurance premiums often rise as a result of these accidents, spreading the financial burden to a wider population.

Legally, drivers caught using cell phones or distracted by secondary screens face penalties. Many states have laws prohibiting texting while driving and restricting the use of handheld devices. Violations can lead to fines, points on driving records, and higher insurance costs. In severe cases, such as accidents resulting in injury or death, drivers may face serious charges, including vehicular manslaughter, which can result in jail time and hefty fines.

Vehicle console screens, as opposed to secondary smartphone displays, are often larger and ergonomically positioned for viewing while driving, integrating better with the vehicle's controls, such as steering wheel buttons and voice commands, enhancing overall usability and safety. The vehicle's built-in display is typically optimized for viewing in various lighting conditions, such as bright sunlight or nighttime driving, ensuring that navigation information remains clear and visible. This design decision is rooted in safety considerations, regulatory compliance, and the goal of providing a better, more integrated driving experience.

The increasing availability of real-time vehicle information offers significant benefits to drivers, such as enhanced awareness of vehicle status, improved safety, and better maintenance planning. Access to real-time data on engine performance, tire pressure, fuel efficiency, and other metrics can help drivers make informed decisions. Early warnings about potential issues like low tire pressure or overheating allow drivers to take preventive action, reducing the risk of accidents or breakdowns. Advanced driver-assistance systems (ADAS) use real-time information to enhance safety. Features like lane departure warnings, adaptive cruise control, and collision detection rely on continuous data monitoring to provide timely alerts and assistance to drivers. Furthermore, real-time diagnostic information helps drivers and mechanics identify issues before they become severe, leading to timely maintenance, reduced repair costs, and extended vehicle lifespan.

However, the influx of data from various sensors and systems raises concerns about driver distraction, particularly from information overload and the use of secondary cell phone screens. When the dashboard is cluttered with numerous indicators and alerts, it can be challenging for drivers to prioritize what is important, potentially leading to confusion and distraction. Modern OBD systems and vehicle diagnostic tools rely on smartphones to display data. While convenient, this can divert the driver's attention from the road to the phone screen. Constantly checking a phone for updates or alerts significantly increases the risk of accidents.

Example embodiments herein balance the benefits of real-time vehicle information with the risks of driver distraction by prioritizing and displaying only important vehicle information not otherwise available to the driver, along with the most critical information and warnings in real-time. Less urgent data is logged for later review, reducing the likelihood of information overload. For instance, immediate safety concerns like engine overheating or low oil pressure trigger prominent alerts, while less critical information can be accessed when the vehicle is stationary or drops below a speed threshold. Instead of relying on secondary cell phone screens, integrating information into the vehicle's built-in display minimizes distraction. Infotainment systems and heads-up displays (HUDs) can provide necessary data without requiring drivers to look away from the road. These systems present information in a clear, concise, and non-intrusive manner.

Integrating artificial intelligence (AI) and machine learning (ML) adds context-aware alerts that adjust based on driving conditions. Non-critical alerts can be muted or minimized during complex driving situations, like heavy traffic or bad weather, and can be displayed prominently when the vehicle is at a stop. Implementing voice-activated controls and audio feedback can help drivers interact with the vehicle's information systems without taking their hands off the wheel or eyes off the road. This reduces the need to look at screens and helps maintain focus on driving.

Example embodiments herein harness the benefits of real-time vehicle information while mitigating the risks of driver distraction. Prioritizing critical data, integrating information into the vehicle's built-in systems, using context-aware alerts, and employing voice commands strike a balance between driver distraction and providing necessary information. This approach ensures drivers receive the information needed to enhance safety and vehicle maintenance without being overwhelmed or distracted.

Example embodiments herein provide OBD information and warnings to drivers using a vehicle's built-in display. Eliminating the need for a secondary display for OBD information provides a first level of diminished driver distraction. Additionally, displayed OBD information is optimized to complement, not duplicate, information already available to drivers through dedicated gauges such as speedometers, tachometers, fuel levels, engine temperature, and the like, as well as to provide critical or important vehicle information that is not otherwise available. Example embodiments further integrate hierarchical, structured driver warnings or notifications and remedial actions that are scaled to a degree of urgency to provide effective, minimally disruptive driver information. Essential information, including warnings and immediate remedial actions required, is initially provided immediately and succinctly. More detailed explanations and/or further instructions are provided when the vehicle is sufficiently slowed or stopped. Less essential information, such as the need for scheduled maintenance, is withheld from display until the vehicle is slowed or stopped.

Communicating image data from a smartphone to a vehicle's onboard display can be achieved through several methods, depending on the capabilities of the vehicle's infotainment system and the smartphone, using platforms like Android Auto or Apple CarPlay. The process starts with establishing a connection, either wired via a USB cable or wirelessly through Bluetooth or Wi-Fi. Once connected, a suitable Android Auto™ or Apple CarPlay® app is used. This app functions to handle image data in accordance with Google or Apple guidelines. The app retrieves or generates the image data, processes it to ensure compatibility with the vehicle's display requirements, and then uses the Android Auto or Apple CarPlay interface to send the image data to the vehicle's infotainment system. The system then renders the image data on the onboard display, ensuring that the user interface is optimized for in-car use to minimize distractions and adhere to safety standards.

Another method involves using Bluetooth or Wi-Fi Direct. First, the smartphone pairs with the vehicle's infotainment system using Bluetooth, or alternatively, establishes a direct wireless connection, such as by using Wi-Fi Direct. The app handles image data and uses Bluetooth or Wi-Fi Direct protocols for data transmission. The app retrieves or generates the image data, processes it into a compatible format, and transmits it over the established connection. The vehicle's infotainment system receives the image data and renders it on the onboard display.

Screen mirroring technologies like Miracast can also be used. Once screen mirroring is enabled on the smartphone, the phone connects to the vehicle's infotainment system using Miracast or a similar technology. The smartphone's screen, including any image data displayed on it, is then mirrored directly to the vehicle's onboard display. Miracast is a wireless display standard that allows the mirroring of content from one device, such as a smartphone, tablet, or laptop, to another device, like a TV, monitor, or car infotainment system, without requiring cables or an internet connection. It uses Wi-Fi Direct to establish a direct connection between devices, supporting high-definition video and high-resolution audio transmission. Miracast is widely supported by modern devices and operating systems, making it easy to stream content wirelessly.

When a Malfunction Indicator Lamp (MIL), commonly referred to as a "check engine light," is illuminated, a driver has no means of readily knowing the cause of the MIL, the severity of the malfunction, what needs to be done, and how soon it needs to be done. Example embodiments herein can automatically initiate secondary ECU test(s) in response to illumination of the MIL to further refine driver warnings and remediations. For example, a MIL may be illuminated for an engine overheating situation, which may also trigger an engine temperature warning light. A supplemental test of the vehicle's coolant temperature sensor and cooling system pressure can indicate that the driver should check for leaks in the coolant system.

The severity of the malfunction may be determined based on the associated vehicle system, wherein certain vehicle systems may be assigned a high severity, while other vehicle systems may be assigned a low severity. Furthermore, the severity of the malfunction may be associated with a diagnostic urgency. For instance, certain malfunctions requiring more immediate attention may be assigned a higher urgency, while other malfunctions may not require immediate attention, and thus, may be assigned a lower urgency. For more information regarding diagnostic urgency, please refer to U.S. Pat. No. 9,761,062, entitled A METHOD AND APPARATUS FOR INDICATING AN AUTOMOTIVE DIAGNOSTIC URGENCY, the contents of which are expressly incorporated herein by reference.

Further example embodiments herein employ AI to significantly enhance vehicle warning systems by providing more intelligent, accurate, and timely alerts to drivers. By analyzing historical data from the vehicle's sensors and systems, AI can predict potential issues before they occur, such as anticipating engine overheating by monitoring trends in temperature fluctuations, coolant levels, and other related parameters. This allows AI to alert the driver before a problem arises, enabling preventive measures. For more information regarding the use of AI in vehicle data analysis, please refer to U.S. Pat. No. 11,915,534, entitled VEHICLE DIAGNOSTICS WITH INTELLIGENT COMMUNICATION INTERFACE, the contents of which are expressly incorporated herein by reference.

AI also improves diagnostics by processing real-time data from various sensors and offering a more precise diagnosis of issues. For example, if an engine overheating warning is triggered, AI can initiate a test sequence and analyze data from the coolant temperature sensor, ambient temperature, driving patterns, and historical maintenance records to pinpoint the exact cause and suggest specific corrective actions. This leads to more effective and informed responses to vehicle issues.

Moreover, AI can enhance the relevance of alerts by considering the driving context. In situations where the engine is overheating while driving uphill on a hot day, AI can provide tailored recommendations, such as reducing speed or taking a break to let the engine cool down. This context-aware guidance helps prevent unnecessary panic and directs the driver toward appropriate actions.

AI also intelligently prioritizes multiple alerts based on their severity and potential impact on vehicle safety. For instance, if both a low tire pressure warning and an engine overheating warning are triggered simultaneously, AI can prioritize the engine overheating alert, as it poses a more immediate threat. This prioritization ensures that critical issues receive the prompt attention they require. The prioritization may be vehicle-specific. In this regard, what may be a priority in one vehicle may not be a priority in another vehicle. For instance, a taller vehicle more susceptible to rolling may place higher priority on suspension-related issues than a lower vehicle. Thus, AI may use vehicle identification information, such as an electronic VIN received from the vehicle, or vehicle identification information entered by the user via the app to make vehicle-specific determinations as to urgency diagnostic priority/urgency.

User-friendly explanations are another benefit of AI integration. Instead of displaying a generic "Check Engine" light, AI can offer detailed and understandable explanations, such as informing the driver that the engine is overheating, describing potential causes, and suggesting immediate actions. This clarity helps drivers better comprehend the situation and take the necessary steps to address it.

AI further integrates with the vehicle's navigation system to suggest routes that avoid heavy traffic or steep inclines when the engine is overheating. It can also alert emergency services or the nearest repair shop if a critical issue is detected, ensuring that the vehicle receives timely assistance. Continuous learning capabilities enable AI systems to improve their diagnostic and predictive accuracy over time. As more data is collected from the vehicle and similar vehicles, the AI system becomes better at predicting and diagnosing issues accurately.

The integration of AI in vehicle warning systems involves continuous data collection from sensors, real-time data analysis, predictive alerts, contextual recommendations, detailed diagnostics, navigation integration, and continuous learning. By implementing AI, drivers can receive more accurate, timely, and actionable information, enhancing vehicle safety and performance. This advanced technology transforms vehicle warning systems into proactive tools that not only alert drivers to issues but also provide intelligent guidance on preventing and addressing problems.

Referring now to the drawings, FIG. 1 illustrates an example embodiment of an operational environment 100 for a moving vehicle diagnostics system with console display integration and contextual warning management. Included is a hardware block diagram 104 for an example embodiment of a moving vehicle diagnostic system with console display integration and contextual warning management used in conjunction with a moving vehicle such as automobile 108, suitably referred hereinafter as a SmartMonitor system. Included in SmartMonitor system 104 are vehicle sensors 112, OBD scanner 120, and a mobile device 124. As used herein a mobile device is suitably comprised of a smartphone, tablet, intelligent OBD dongle, or any other suitable portable data device. Mobile device 124 includes a speaker 128, microphone 132, CPU 136, memory 140 and GPS receiver 144. Also included in SmartMonitor system 104 is diagnostic system 148 and vehicle infotainment system display 152. SmartMonitor system 104 is in data communication with network cloud 156, suitably comprised of any wireless or wired data carrier, and may include a local area network (LAN), a wide area network (WAN), which may comprise the Internet, or any suitable combination thereof.

Also in data communication with network cloud 156 is cloud server 160. The SmartMonitor system can enhance its diagnostic and warning capabilities by accessing a wide range of information from cloud services. Through cloud-based DTC lookups, the system can provide detailed explanations of diagnostic trouble codes (DTCs) and suggest possible problem solutions, guiding drivers on the next steps to take. It can also access real-time data to locate nearby repair centers, gas stations, and car parts stores, helping drivers quickly find the resources they need. Additionally, by integrating current weather conditions, the system can offer context-aware alerts, such as advising caution during adverse weather. The SmartMonitor system can further leverage AI applications in the cloud to predict potential issues based on patterns and integrate data received from other vehicles or repair shops, providing a more comprehensive and accurate diagnosis. This connected approach allows the system to offer drivers not just immediate information about their vehicle's condition but also actionable insights and convenient access to essential services. Cloud Server 160 is also in data communication with vehicle service or supply centers, such as repair shop, as well as additional peer vehicles 168 which are also provided with a SmartMonitor system. Information from establishments such as repair shop 164 and peer vehicles 168 provides additional input and feedback to facility machine learning at cloud server 160 to further refine smart monitoring.

Figure 2:
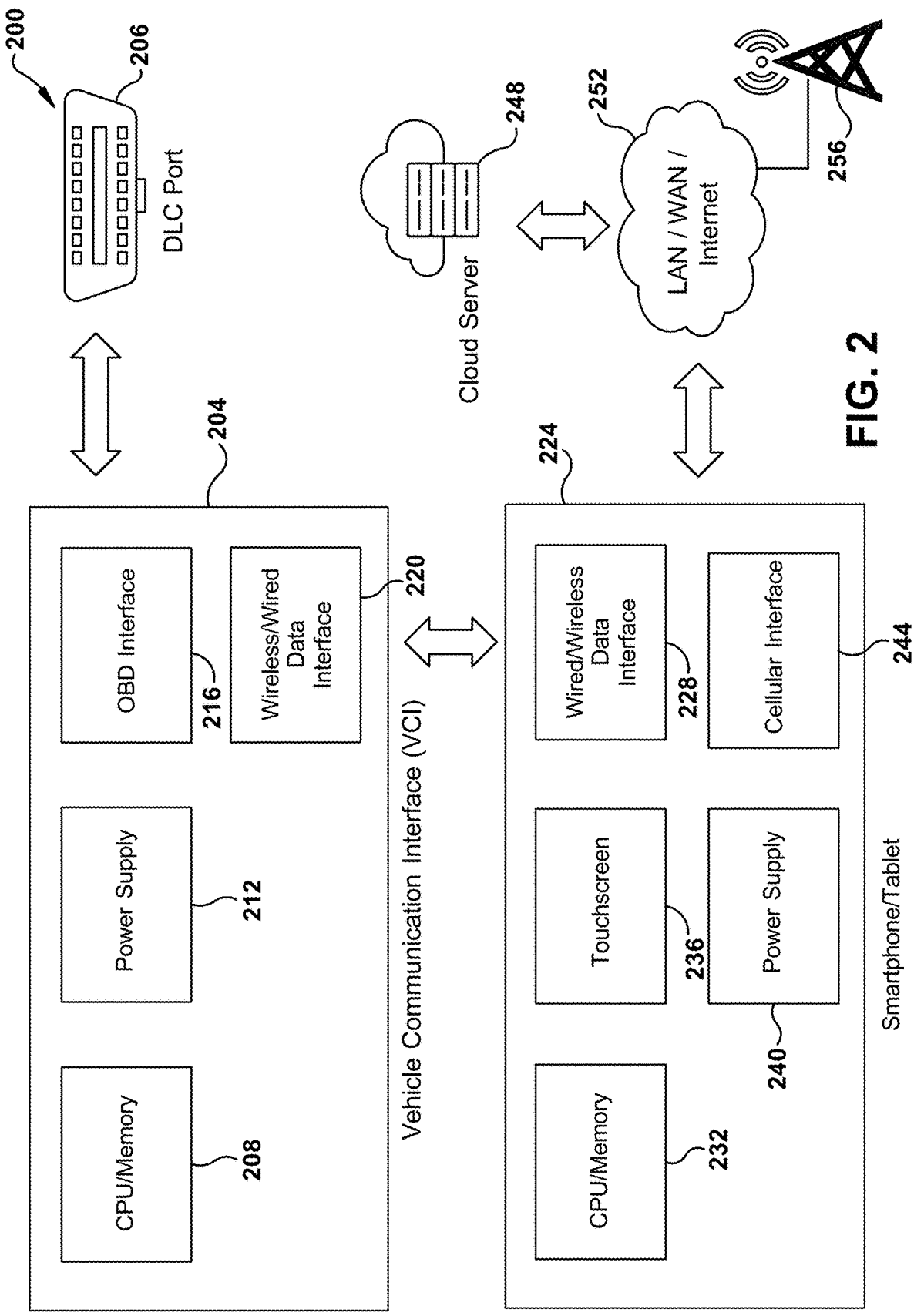
FIG. 2 illustrates a block diagram of hardware and data flow in connection with a moving vehicle diagnostics system with console display integration and contextual warning management.

FIG. 2 illustrates a block diagram 200 of hardware and data flow in connection with a SmartMonitor system. Included is a vehicle communication interface (VCI) 204 which is configure to be connected for data exchange with a vehicle DLC port 206 by direct connection, such as via a dongle, or by any suitable wireless or wired data path. VCI 204 includes CPU and associated memory 208, power supply 212, OBD interface 216 and a wireless and/or wired data interface 220.

VCI 204 is in data communication with a mobile device 224, suitably comprised of a smartphone, tablet, or the like, via data communication between data interface 220 and wireless and/or wired data interface 228. Also included in mobile device 224 is CPU and associated memory 232, touchscreen 236, power supply 240 and cellular interface 244. Mobile device 224 is data communication with cloud server 248 via network cloud 252, which may further comprise cellular data connection via cell tower 256.

Figure 3:
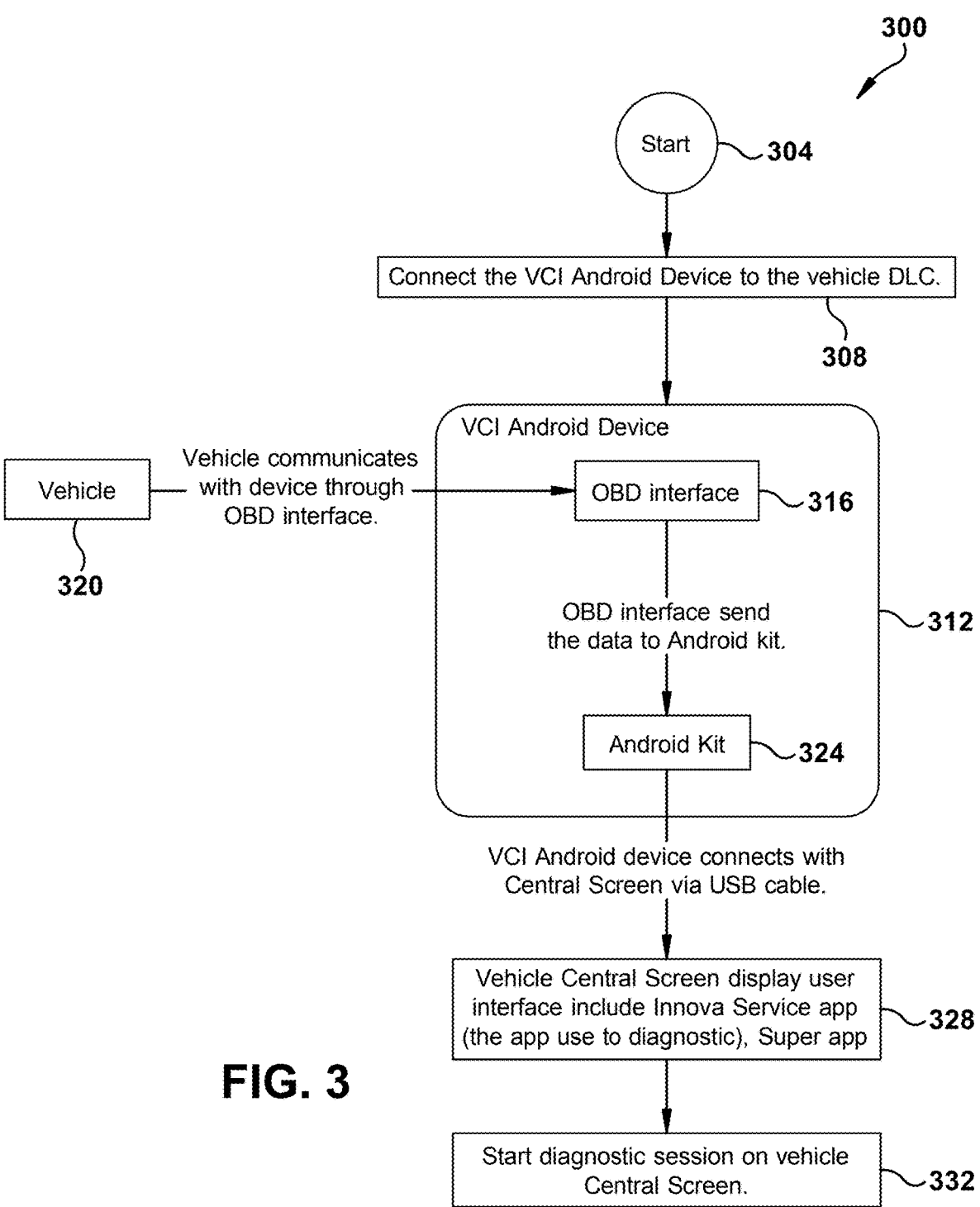
FIG. 3 illustrates a flow diagram for a moving vehicle diagnostics system with console display integration and contextual warning management that is hardwired to a vehicle central screen.

FIG. 3 illustrates a flow diagram 300 for a SmartMonitor that is hardwired to a vehicle central screen. The process commences at block 304 and proceeds to block 308 where an VCI Android SmartMonitor 312 device, by way of example, is connected to a vehicle DLC. OBD interface 316 of SmartMonitor 312 is in data communication with vehicle 320. SmartMonitor 312 includes Android kit 324 which is in data communication with OBD interface 316. This kit suitably includes any suitable SmartMonitor app, a software development kit (SDK) with libraries and APIs for creating or modifying Android applications that interact with the vehicle's diagnostic systems, and hardware interfaces like a VCI device for communication between the vehicle's OBD2 port and the Android device via Bluetooth, WiFi, or USB. It also suitably encompasses cloud integration tools for accessing services like DTC lookups and real-time weather updates, as well as user interface components optimized for displaying information in a driver-friendly manner on Android devices, particularly through Android Auto. This Android kit enable seamless deployment and customization of the SmartMonitor system, enhancing the driver's ability to monitor and manage vehicle health in real-time.

Android kit 324 is connected to a vehicle central screen display 328 with a wired connection, suitably a USB connection to allow for passing display information to be shown on the vehicle console. Thereafter, a diagnostic screen session 332 is commence on the vehicle screen at block 332.

Figure 4:
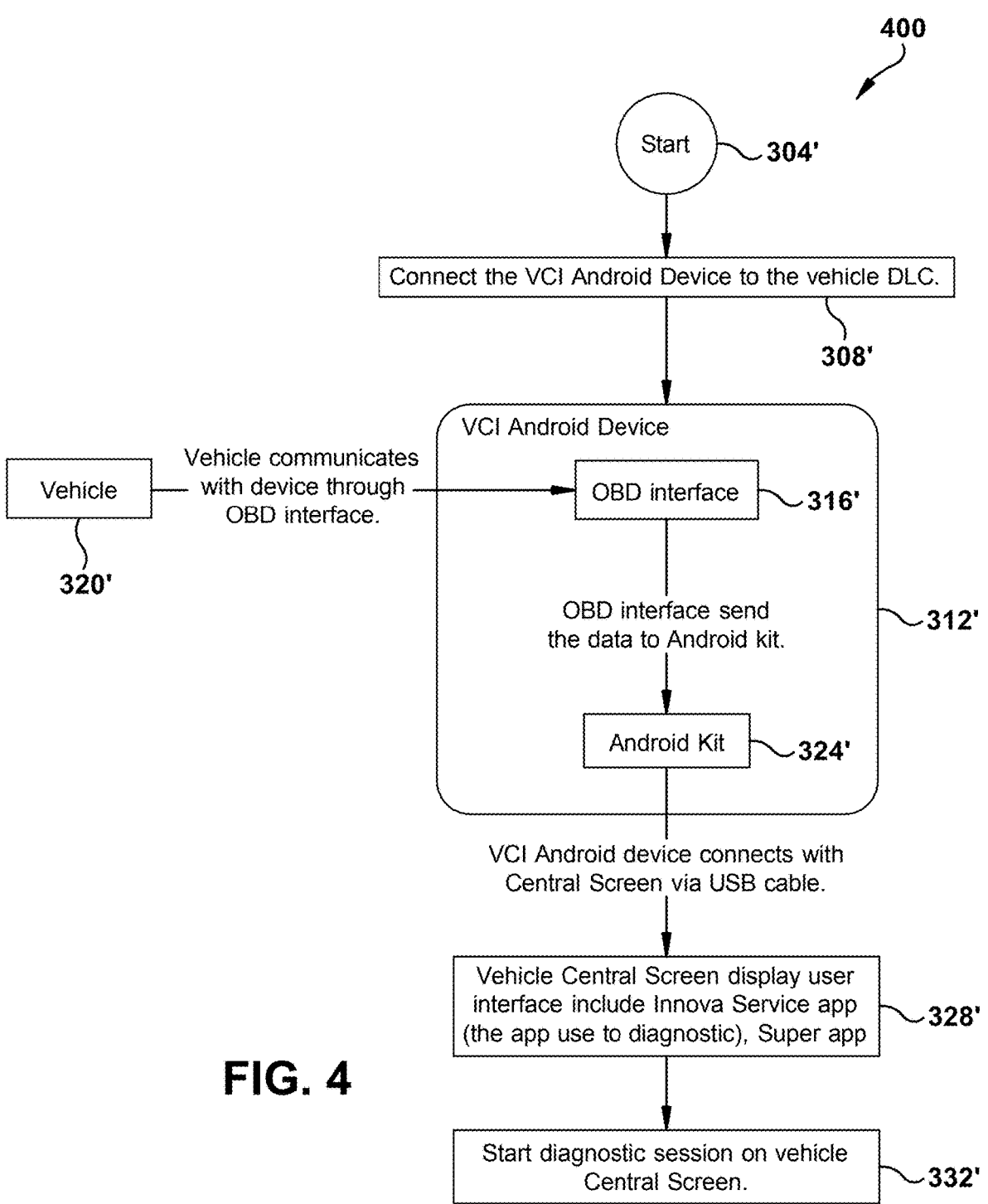
FIG. 4 illustrates a flow diagram for a moving vehicle diagnostics system with console display integration and contextual warning management that connected to a vehicle central screen via Android Auto wireless.

FIG. 4 illustrates a flow diagram 400 for a SmartMonitor that is connected to a vehicle central screen via Android Auto wireless. Corresponding blocks of FIG. 3 are similarly numbered and primed, and the Android Auto wireless connection indicated between Android kit 324' and 328'. The Android Auto wireless connection provides a data link between the Android smartphone to the vehicle's infotainment system without using a USB cable, enabling the Android Auto interface to appear on the car's display and allow control functions like navigation, music, and messaging through the car's controls or voice commands. This connection is established using a combination of Bluetooth and WiFi, with Bluetooth initiating the connection and WiFi handling data transfer. It offers the same functionality as a wired connection, providing a seamless and convenient experience by automatically connecting when entering a vehicle, as long as both the smartphone and the car's infotainment system support Android Auto wireless.

Figure 5:
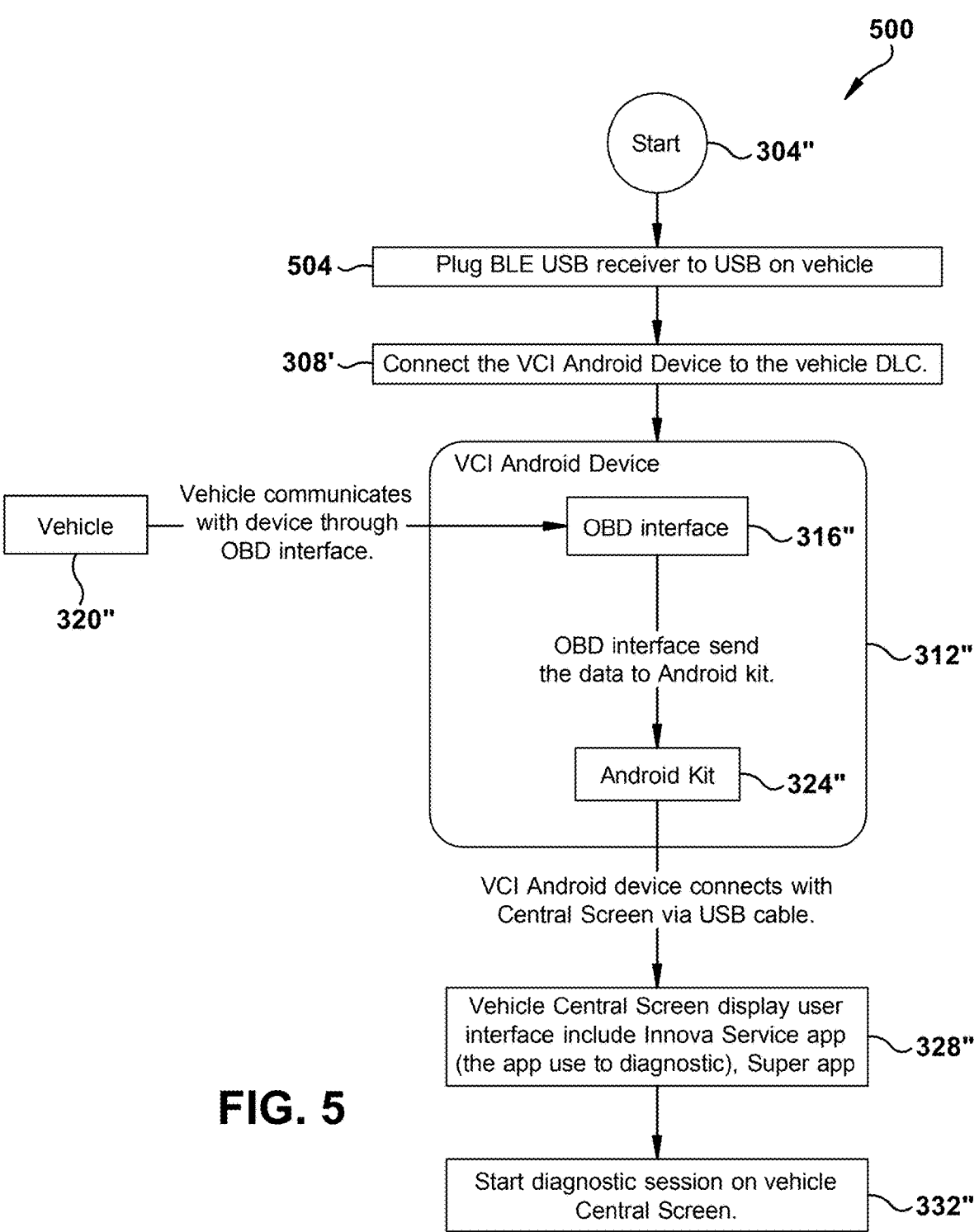
FIG. 5 illustrates a flow diagram for a moving vehicle diagnostics system with console display integration and contextual warning management that is connected to a vehicle central screen via Bluetooth Low-Energy (BLE)

FIG. 5 illustrates a flow diagram 500 for a SmartMonitor that is connected to a vehicle central screen via BLE (Bluetooth Low-Energy). Corresponding blocks of FIG. 3 are similarly numbered and double primed, and the BLE wireless connection indicated between Android kit 324" and 328". Included in flow diagram 500 is an additional step 504 where a BLE connection is made through a device USB port. BLE is a wireless communication technology designed for short-range data transmission with low power consumption, making it ideal for devices that require long battery life, such as wearables, smart home devices, and IoT applications. BLE operates in the 2.4 GHz ISM band, similar to classic Bluetooth, but is optimized for low power and intermittent data transmission rather than continuous streaming. Its functions include connecting and exchanging data between devices, such as sending notifications from a smartwatch to a smartphone or controlling smart home devices remotely. The advantages of BLE include its energy efficiency, which allows devices to run on small batteries for extended periods, and its ability to support a wide range of devices and applications while maintaining reliable communication with minimal power usage.

Figure 6:
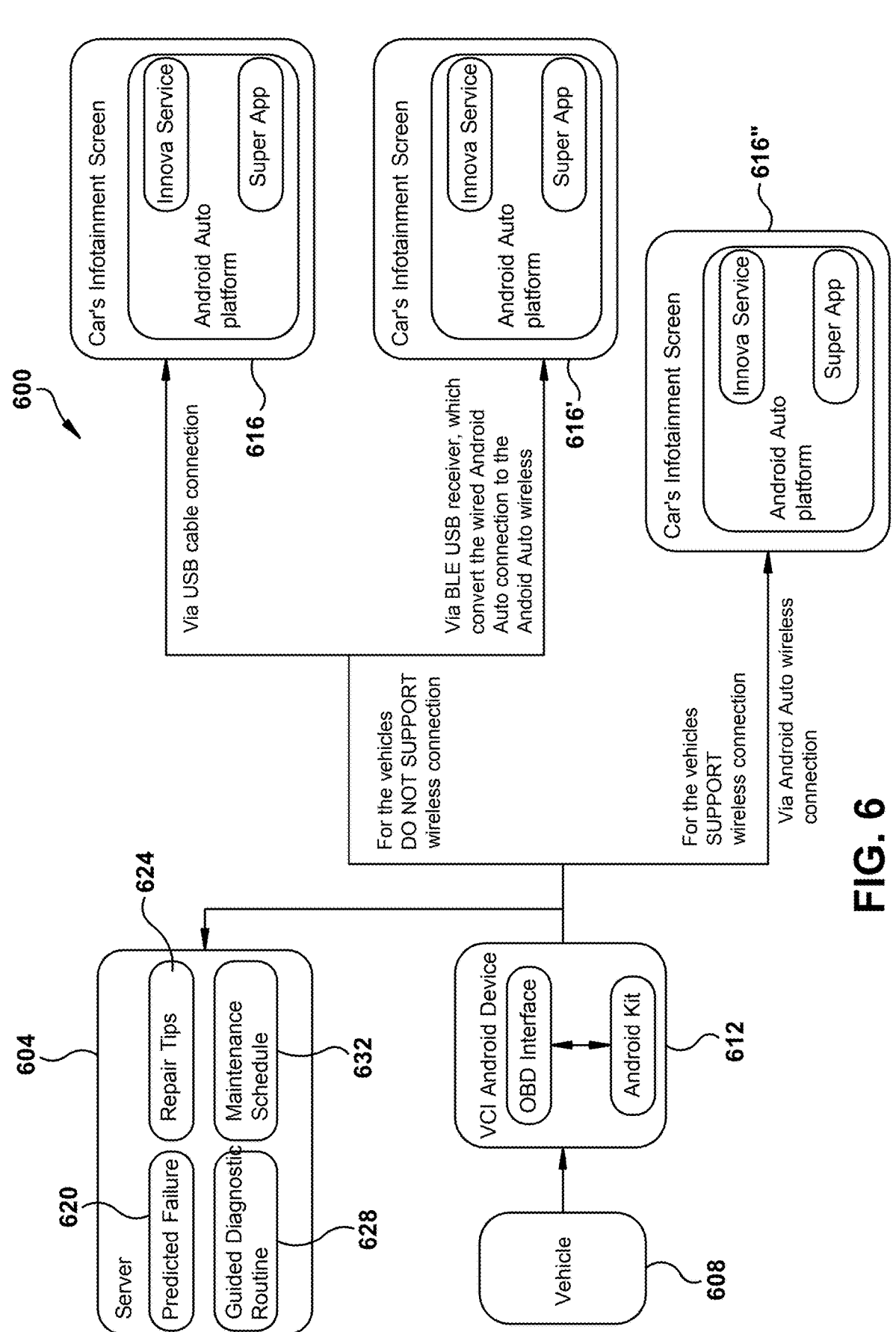
FIG. 6 is a block diagram showing information flow among a server, a vehicle VCI Android device and vehicle infotainment screens.

FIG. 6 is a block diagram 600 showing information flow among server 604, vehicle 608, VCI Android device 612 and vehicle infotainment screens 616, with a USB cable connection, 616' with a BLE connection and 616" with an Android Auto wireless connection. Server 604, suitably a cloud server, provides functionality including predicted failures 620, repair tips 624, guided diagnostic routines 628 and maintenance schedules 632.

Figure 7:
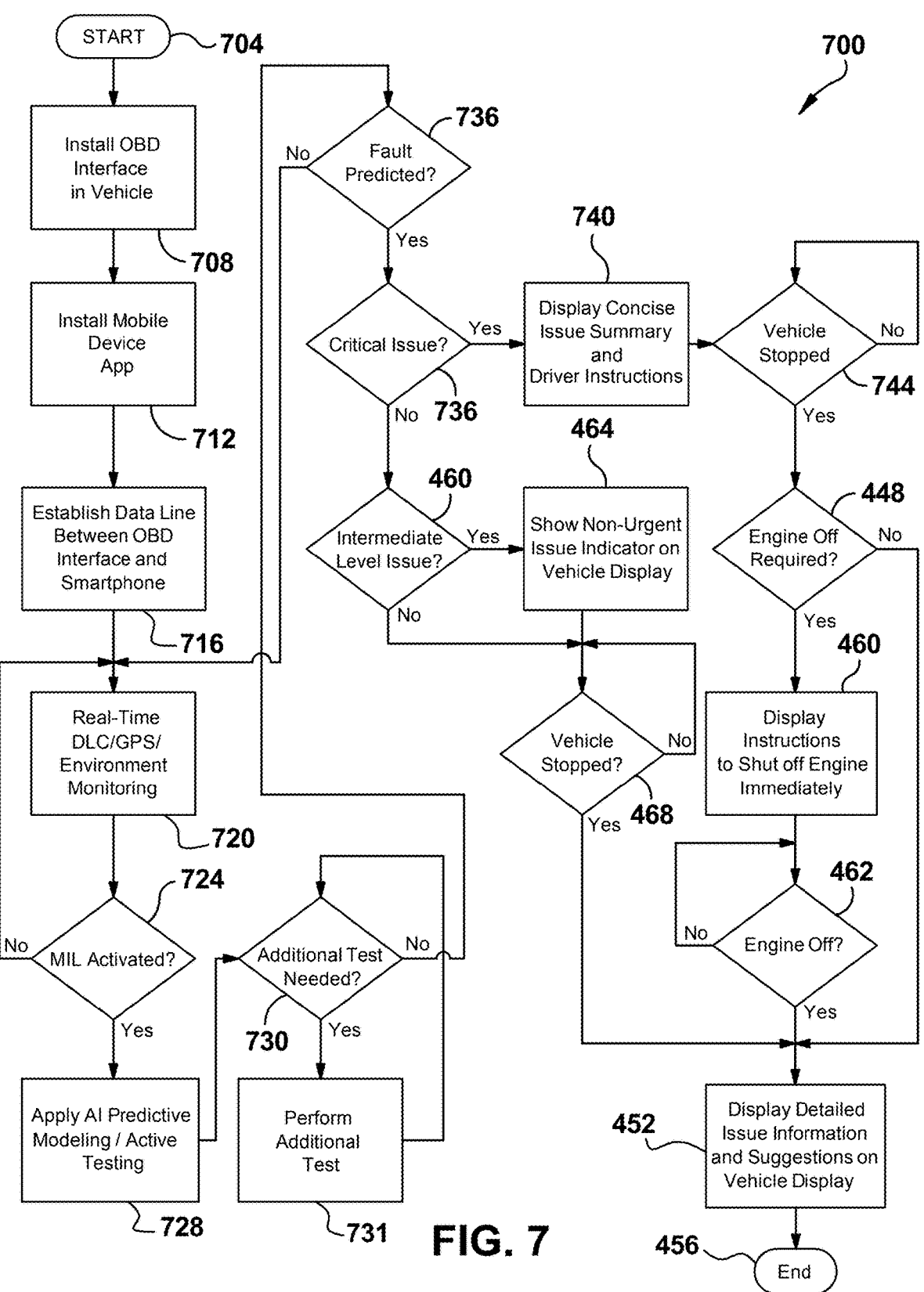
FIG. 7 illustrates an example embodiment of a flowchart for a moving vehicle diagnostics system with console display integration and contextual warning management.

FIG. 7 illustrates flowchart 700 for an example embodiment of a SmartMonitor system. The process commences at block 704 and proceeds to block 708 where an OBD interface is installed in a vehicle. Next, an app installed in a mobile device, such as a smartphone, at block 712. A data connection is the established between the OBD interface and the smartphone at block 716. Real-time DLC, GPS and environment monitoring is accomplished at block 720 until such time a MIL is detected at block 724. Once a MIL is activated, AI predictive modelling and active testing is completed at block 728. A determination is made at block 730 as to whether additional information is obtainable and helpful. If so, additional testing is completed at block 731. When no additional tests are needed, the process proceeds to block 732 for fault determination.

If no fault is predicted at block 732, the process returns to block 720. If a fault is predicated, a determination is made at block 736 as to whether the fault is critical, requiring a vehicle stop. If so, an initial, concise explanation and driver instructions to stop is displayed at block 740. Once a determination is made at block 744 that the vehicle is stopped, a determination is made as to whether the critical issue requires an engine shutdown, such as in a case of imminent engine fire, fuel leakage, etc. If stopping the engine is not required, a detailed explanation and driver instructions are shown on the console display at block 452, safely readable by the driver since the vehicle is stopped. The process then ends at block 456. If an engine shutdown is required at block 448, persistent instructions for engine shutdown are displayed on the vehicle console at block 460, which instructions remain until the vehicle is stopped as determined by block 462. Once stopped, the process proceeds to block 452 for expanded information.

If it is determined at block 736 that the MIL does not present a critical issue, a determination is made at block 460 as to whether an intermediate level issue exits. Example intermediate level issues include relatively minor tire pressure warnings, oil change reminders, battery health warnings, relatively low engine coolant and wearing brake pads. If an intermediate issue exists, a corresponding indicator is shown on the vehicle display at block 464. Once the vehicle is stopped as determined at block 468, expanded information is provided on the console at block 452. When low level issues are only present at block 460, no immediate information is given to the driver, until the vehicle is stopped as determined by block 468. Example, low level issues include low windshield washer fluid, scheduled maintenance reminders, available software updates, tire wear indicators, air filter replacement or low fuel economy warning.

Figure 8:
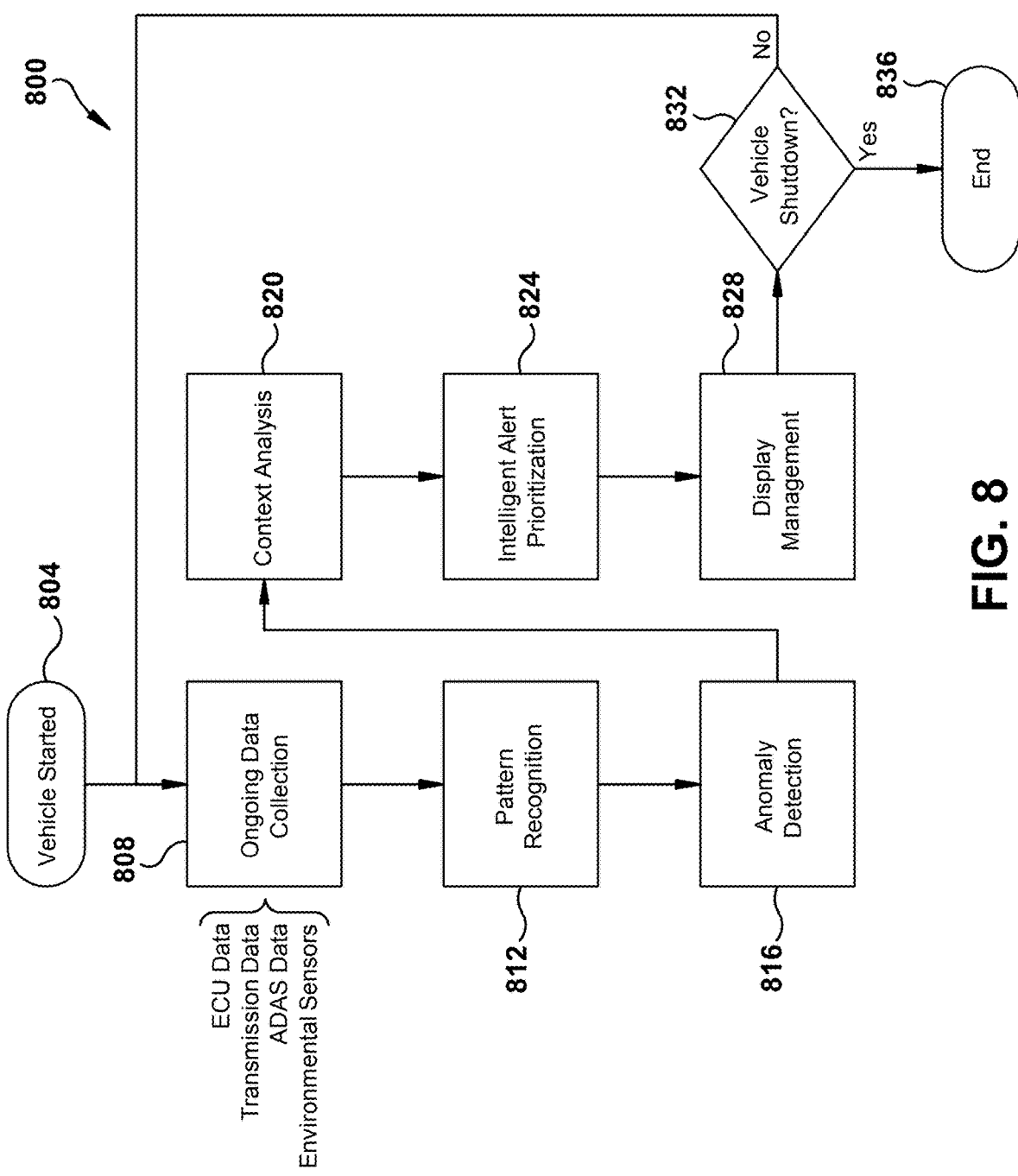
FIG. 8 illustrates an example embodiment of an AI flow diagram to achieve a balanced integration of real-time vehicle information and minimize driver distraction in a moving vehicle diagnostics system with console display integration and contextual warning management.

FIG. 8 illustrates an example embodiment of an AI flow diagram 800 to achieve a balanced integration of real-time vehicle information and minimize driver distraction. The AI-based system encompasses data collection, processing, context analysis, and intelligent display management.

The AI system begins at block 804 and proceeds to block 808 where continuous data collection is made from sensors and systems within the vehicle, such as engine performance metrics, coolant temperature, oil pressure, transmission data, tire pressure levels, ADAS data like lane departure and adaptive cruise control status, and environmental sensors that monitor external temperature, humidity, and road conditions. This raw data is then transmitted to an AI processor, where it is processed to identify any potential issues or deviations from normal operating conditions. Pattern recognition 812 helps identify potential problems like rising engine temperature or decreasing tire pressure, while anomaly detection 816 focuses on sudden changes that could indicate immediate concerns, such as a sudden drop in oil pressure. Context analysis 820 considers factors such as driving behavior, environmental conditions and historical data. Application of AI then proceeds to intelligent alert prioritization 824, and ultimately to display management

828. The process continues until vehicle shutdown occurs at block 832, at which time the process ends at block 836.

Figures 9, 10:
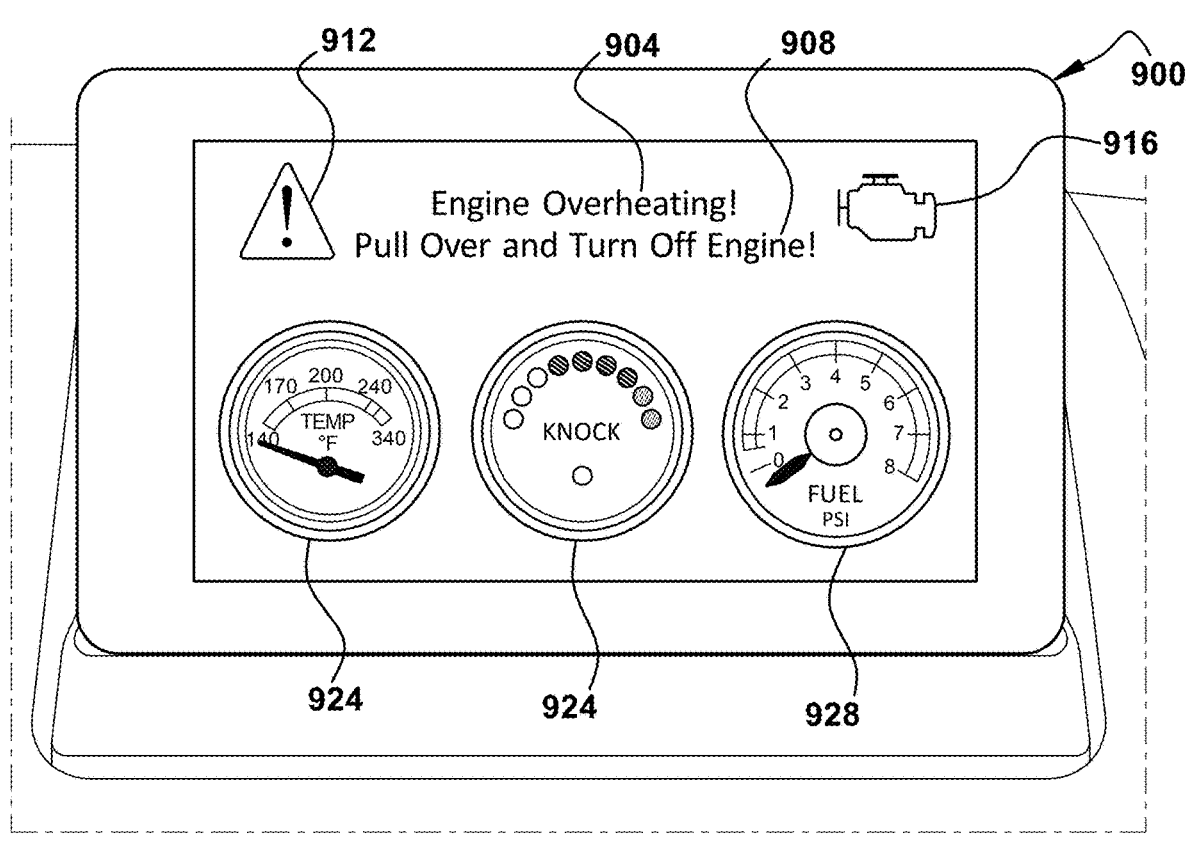
FIG. 9 illustrates an example embodiment of an integrated vehicle console display an initial warning for a moving vehicle diagnostic system with console display integration and contextual warning management while a vehicle is in motion.
FIG. 10 illustrates integrated console display which has been modified with additional information relevant to the initial warning of FIG. 9 once the vehicle is stopped.

FIG. 9 illustrates an example embodiment of an integrated vehicle console display 900 for a moving vehicle diagnostic system with console display integration and contextual warning management while a vehicle is in motion. In the illustrate example a DTC had triggered a MIL, determined to be critical. A succinct message with a diagnosis 904 and instructions 908 is shown, suitably accompanied by indicia to catch a driver's attention, such as urgency indicator 912 and a more familiar check engine symbol 916, which is now defined for the driver. The example display 900 also includes valuable real-time information that is not readily available by other dashboard indicators, including transmission temperature gage 924, knock sensor gage 924 and fuel pressure gage 928.

FIG. 10 illustrates integrated console display 900' which has been modified with additional information relevant to the initial warning of FIG. 9 once the vehicle is stopped. The expanded information includes or more detailed explanation relative to current or possible vehicle damage. Also included are instructions for possible remedial action, suitably derived from additional OBD data that may be related.

As explained throughout, the disclosed system may differentiate between essential information that may be displayed immediately to a driver and other information, such as more detailed explanations and/or further instructions, that may be withheld from display until the vehicle is slowed or stopped. It is also contemplated that such less essential or more detailed information may be provided to the driver via spoken language to allow the driver to keep his/her eyes on the road. The driver's request for more information (e.g., "What do I need to do about the check engine light?") may likewise be made using spoken language, preferably natural language as opposed to a limited set of predetermined commands. In this regard, the disclosed system may integrate natural language processing (NLP) technology in order to reduce the amount of visually displayed information as well as any need for the driver to make selections manually (e.g., using a touchscreen). Contemplated systems integrating NLP technology into vehicle diagnostics systems such as the disclosed system may include U.S. Pat. No. 11,915,534, entitled "Vehicle Diagnostics with Intelligent Communication Interface," the entire contents of which is incorporated by reference herein. By virtue of such NLP technology, the smart monitor system 104 may, for example, receive a communication from the driver, input the communication to a chatbot (e.g., OpenAI's ChatGPT), receive a response from the chatbot that includes a sequence of words, and extract one or more keywords from the sequence of words for further processing including instructing the driver's mobile app or portable data device to perform diagnostic functions and/or presenting additional information (on display or through spoken language).

The particulars shown herein are by way of example only for purposes of illustrative discussion, and are not presented in the cause of providing what is believed to be most useful and readily understood description of the principles and conceptual aspects of the various embodiments of the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. A moving vehicle diagnostic system with console display integration comprising a mobile device including:
   a processor and associated memory; and
   an onboard diagnostic (OBD) data input configured to receive vehicle status data via an associated vehicle data link connector (DLC);
   wherein the processor is configured to
      establish a data link to an associated vehicle infotainment system console display,
      determine one or more vehicle conditions from received vehicle status data,
      determine a severity of each determined vehicle condition,
      communicate a warning to show on the console display for each vehicle condition determined to have a severity that requires immediate remedial action,
      generate an expanded explanation for one or more determined vehicle conditions,
      determine remedial action for one or more determined vehicle conditions,
      determine when the vehicle is stopped in accordance with received vehicle status data, and
      communicate one or more of a generated expanded explanation and determined remedial action to show on the console display when the vehicle is determined to be stopped.

2. The moving vehicle diagnostic system with console display integration comprising a mobile device of claim 1 wherein the processor is further configured to communicate a persistent vehicle status indicator to show on the console display corresponding to the received vehicle status data.

3. The moving vehicle diagnostic system with console display integration comprising a mobile device of claim 1 wherein the processor is further configured to:
   determine if a malfunction indicator lamp (MIL) signal is present in the received vehicle status data;
   determine a cause of the MIL;
   generate a concise explanation of the MIL;
   communicate the generated concise explanation of the MIL for immediate showing on the console display.

4. The moving vehicle diagnostic system with console display integration comprising a mobile device of claim 3 wherein the processor is further configured to
   determine whether supplemental OBD information corresponding to one or more determined vehicle condition is obtainable by a query transmitted via the data link;
   initiate one or more queries via the data link when supplemental OBD information is determined to be available;
   receive secondary vehicle data responsive to the one or more queries; and
   generate the one or more expanded explanation in accordance received secondary vehicle data.

5. The moving vehicle diagnostic system with console display integration comprising a mobile device of claim 4 wherein the processor is further configured to
   retrieve historical OBD data from the memory corresponding to one or more previously determined vehicle conditions;
   perform contextual analysis on the one or more determined vehicle conditions in accordance with retrieved historical OBD data; and
   determine the severity of one or more of the determined vehicle condition in accordance with the contextual analysis.

6. The moving vehicle diagnostic system with console display integration comprising a mobile device of claim 5 wherein the processor is further configured to:

receive environmental data regarding a current weather environment of the vehicle from associated vehicle sensors or via mobile device cellular connection;

receive location data corresponding to a location of the vehicle via a mobile device Global Positioning System (GPS) receiver; and perform the contextual analysis on the one or more determined vehicle conditions in accordance with one or more of the environmental data and the location data; and determine the remedial action in accordance with the contextual analysis.

7. The moving vehicle diagnostic system with console display integration comprising a mobile device of claim 1 wherein the processor is configured to establish the data link via a wireless data connection comprising one or more of Bluetooth, Bluetooth Low Energy (BLE), WiFi or WiFi direct.

8. The moving vehicle diagnostic system with console display integration comprising a mobile device of claim 1 wherein the processor is configured to establish the data link via a Universal Serial Bus (USB) connection.

9. A method of providing structured, real-time driver information through a vehicle display console comprising:

receiving vehicle status data via an onboard diagnostic (OBD) data input via an associated vehicle data link connector (DLC);

establishing a data link to an associated vehicle infotainment system console display;

determining one or more vehicle conditions from received vehicle status data;

determining a severity of each determined vehicle condition;

showing a warning on a vehicle console display for each vehicle condition determined to have a severity that requires immediate remedial action on the console display;

determining an expanded explanation for one or more determined vehicle conditions;

determining remedial action for one or more determined vehicle conditions;

determining when the vehicle is stopped in accordance with received vehicle status data; and communicating one or more of a generated expanded explanation and determined remedial action for showing on the console display when the vehicle is determined to be stopped.

10. The method of providing structured, real-time driver information through a vehicle display console of claim 9 further comprising:

determining if a malfunction indicator lamp (MIL) signal is present in the received vehicle status data;

determining a cause of the MIL;

generating a concise explanation of the MIL;

showing the generated concise explanation of the MIL for immediate showing on the console display.

11. The method of providing structured, real-time driver information through a vehicle display console of claim 10 further comprising:

determining whether supplemental OBD information corresponding to one or more determined vehicle condition is obtainable by a query transmitted via the data link;

initiating one or more queries via the data link when supplemental OBD information is determined to be available;

receiving secondary vehicle data responsive to the one or more queries; and generating the one or more expanded explanation in accordance received secondary vehicle data.

12. The method of providing structured, real-time driver information through a vehicle display console of claim 11 further comprising:

retrieving historical OBD data from the memory corresponding to one or more previously determined vehicle conditions;

performing contextual analysis on the one or more determined vehicle conditions in accordance with retrieved historical OBD data; and determining the severity of one or more of the determined vehicle condition in accordance with the contextual analysis.

13. The method of providing structured, real-time driver information through a vehicle display console of claim 12 further comprising:

receiving environmental data regarding a current weather environment of the vehicle from associated vehicle sensors or via mobile device cellular connection;

receiving location data corresponding to a location of the vehicle via a mobile device Global Positioning System (GPS) receiver; and performing the contextual analysis on the one or more determined vehicle conditions in accordance with one or more of the environmental data and the location data; and determining the remedial action in accordance with the contextual analysis.

14. The method of providing structured, real-time driver information through a vehicle display console of claim 13 further comprising communicating a persistent vehicle status indicator for showing on the console display corresponding to the received vehicle status data.

15. The method of providing structured, real-time driver information through a vehicle display console of claim 14 further comprising establishing the data link via a wireless data connection comprising one or more of Bluetooth, Bluetooth Low Energy (BLE), WiFi or WiFi direct.

16. The method of providing structured, real-time driver information through a vehicle display console of claim 14 further comprising establish the data link via a Universal Serial Bus (USB) connection.

17. A computer program product comprising one or more non-transitory program storage media on which are stored instructions executable by a processor or programmable circuit to perform operations for providing structured, real-time driver information through a vehicle display console, the operations comprising:

receiving vehicle status data via an onboard diagnostic (OBD) data input via an associated vehicle data link connector (DLC);

establishing a data link to an associated vehicle infotainment system console display;

determining one or more vehicle conditions from received vehicle status data;

determining a severity of each determined vehicle condition;

showing a warning on a vehicle console display for each vehicle condition determined to have a severity that requires immediate remedial action on the console display;

determining an expanded explanation for one or more determined vehicle conditions;

determining remedial action for one or more determined vehicle conditions;

determining when the vehicle is stopped in accordance with received vehicle status data; and communicating one or more of a generated expanded explanation and determined remedial action for showing on the console display when the vehicle is determined to be stopped.

18. The computer program product for providing structured, real-time driver information through a vehicle display console of claim 17, the operations further comprising:

determining if a malfunction indicator lamp (MIL) signal is present in the received vehicle status data;

determining a cause of the MIL;

generating a concise explanation of the MIL;

showing the generated concise explanation of the MIL for immediate showing on the console display.

19. The computer program product for providing structured, real-time driver information through a vehicle display console of claim 18, the operations further comprising:

determining whether supplemental OBD information corresponding to one or more determined vehicle condition is obtainable by a query transmitted via the data link;

initiating one or more queries via the data link when supplemental OBD information is determined to be available;

receiving secondary vehicle data responsive to the one or more queries; and generating the one or more expanded explanation in accordance received secondary vehicle data.

20. The computer program product for providing structured, real-time driver information through a vehicle display console of claim 18, the operations further comprising:

retrieving historical OBD data from the memory corresponding to one or more previously determined vehicle conditions;

performing contextual analysis on the one or more determined vehicle conditions in accordance with retrieved historical OBD data; and determining the severity of one or more of the determined vehicle condition in accordance with the contextual analysis.

* * * * *